ered Oct. 31, 1967

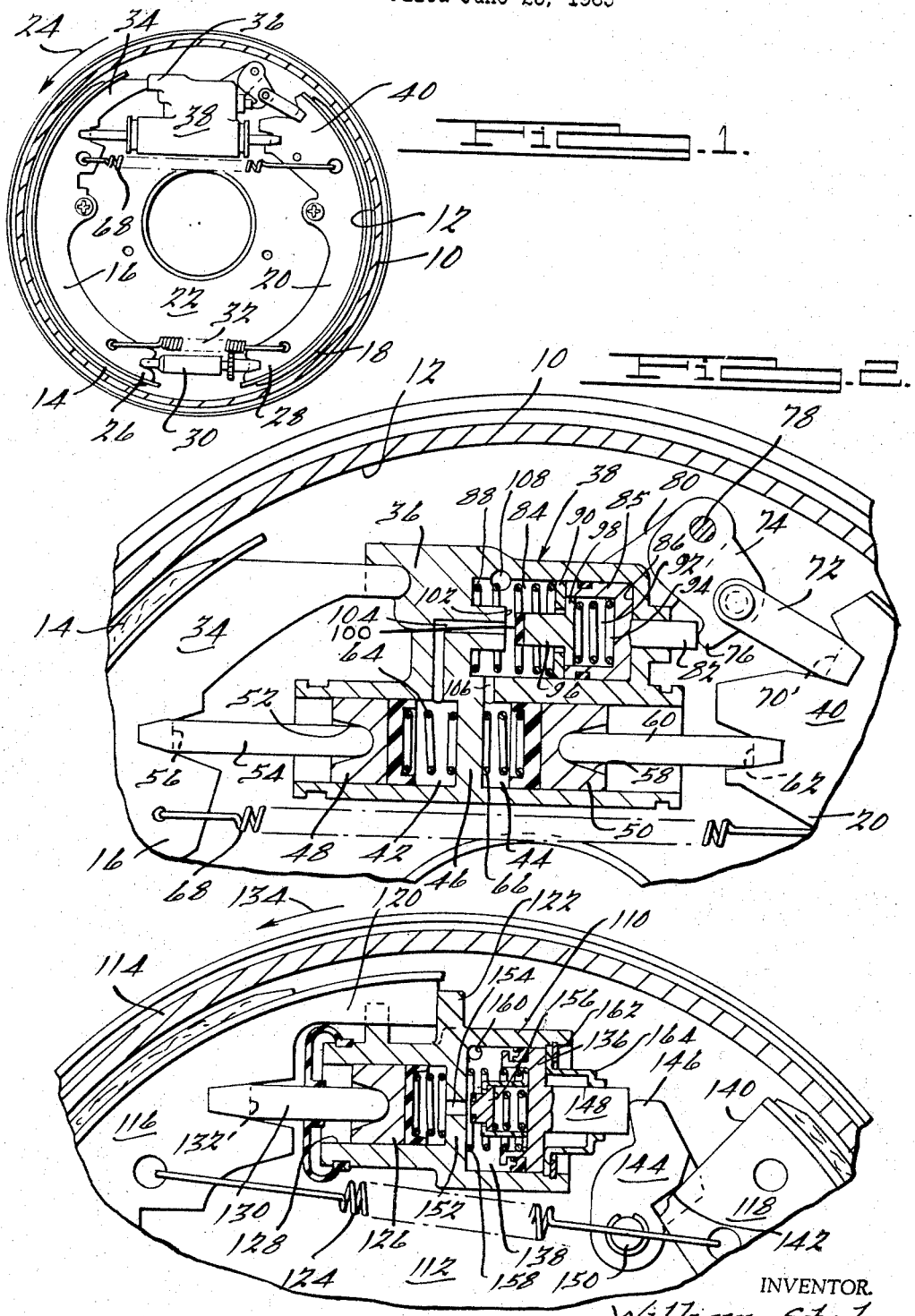

3,349,875
CONTROLLED TORQUE DRUM BRAKE
William Stelzer, Bloomfield Hills, Mich., assignor to Kelsey-Hayes Company
Filed June 25, 1965, Ser. No. 466,979
5 Claims. (Cl. 188—152)

This invention relates to hydraulic brakes for automotive vehicles and particularly to a self-energized drum brake.

It is an object of the present invention to provide a self-energized drum brake having means for positively controlling the degree of energization of the brake.

It is another object of the present invention to provide a self-energized drum brake which may utilize relatively high coefficient friction lining materials to achieve greater braking torque without impairing the stability of the brake.

It is a still further object of the present invention to provide a hydraulic brake which is able to produce a high braking torque for the amount of energy delivered to it, thereby permitting a reduction in the size of any power booster utilized in the braking system or completely eliminating the need for a power booster.

It is a further object of the present invention to provide a self-energized drum brake in which the braking torque has a substantially linear relationship to the hydraulic pressure delivered to the brake.

It is yet a further object of the present invention to provide a drum brake which may be utilized in a manner compensating for the weight transfer of the vehicle between the front and rear wheels to permit maximum utilization of both front and rear brakes without producing premature rear wheel skidding or excessive wear of the front brakes.

These and other objects of the present invention will become apparent from the following detailed description taken in conjunction with the accompanying drawings, wherein:

FIG. 1 is a view of a brake made in accordance with the present invention and an associated brake drum, the brake being shown in elevation and the brake drum being shown in section;

FIG. 2 is an enlarged fragmentary sectional view of a portion of the structure illustrated in FIG. 1, and FIG. 3 is a view of the structure similarly illustrated in FIG. 2 showing a modified form of the present invention.

Referring now to the drawings, and particularly to FIG. 1, the number 10 indicates a brake drum and particularly the braking flange thereof. The brake drum 10, is, of course, bolted to the wheel (not shown) of the vehicle and rotates with the wheel. The inner peripheral surface 12 of the brake drum 10 is adapted for frictional engagement by a friction lining 14 of a primary brake shoe 16, and a friction lining 18 of a secondary brake shoe 20. The brake shoes 16 and 20 are mounted on a stamped sheet metal backing plate 22 which is adapted to be bolted or otherwise secured to a steering knuckle, rear axle housing flange or other stationary portion of the vehicle adjacent to the wheel (not shown). The brake shoes are designated "primary" and "secondary" by reason of the direction of rotation of the brake drum 10 when the vehicle is moving in a forward direction. This direction of rotation is indicated by the number 24 and will be seen to be counterclockwise. Inasmuch as the shoe 16 is immediately ahead of the wheel cylinder in the direction of forward rotation, it is termed the "primary" shoe.

One end 26, which may be termed the heel, of the brake shoe 16 is connected to an end 28, which may be termed the toe, of the brake shoe 20 by an adjustable circumferentially rigid strut 30. The heel 26 and toe 28 are held in engagement with the strut 30 by means of a coil spring 32. The brake shoe 16 has an opposite end 34, which may be termed a toe, that is engageable with a fixed anchor 36, formed as a boss on a wheel cylinder 38. The wheel cylinder is securely fastened to the backing plate 22. While the toe 34 of the shoe 16 is positioned on the left hand side of the wheel cylinder 38, the shoe 20 has a heel 40 positioned adjacent the right hand side of the wheel cylinder 38.

The details of construction of the wheel cylinder 38 and its method of connection to the brake shoes 16 and 20 are illustrated in detail in FIG. 2. By reference to this figure, it will be seen that the cylinder 38 is provided with a pair of coaxial bores 42 and 44 which are of equal diameter but are separated from one another with a dividing wall 46. The bores 42 and 44 are open at their outer ends and are fitted with pistons 48 and 50 respectively. The piston 48 has a tapered socket 52 which receives one end of a link 54 that is fitted at its opposite end within a slot 56 of the toe 34 of the brake shoe 16. The link 54 thus provides a circumferentially rigid but pivotal interconnection between the piston 48 and the brake shoe 16. Similarly, the piston 50 is provided with a tapered socket 58 which receives one end of a rigid link 60, that is received at its opposite end within a slot 62 of the heel 40 of the brake shoe 20. The link 60 provides a pivotal but circumferentially rigid connection between the piston 50 and the brake shoe 20. The pistons 48 and 50 are biased outwardly toward their adjacent brake shoes by means of a pair of coil springs 64 and 66, respectively. The springs 64 and 66 serve to maintain the links 54 and 60 in tight fitting contact with their associated pistons and brake shoes. The combined forces of the springs 64 and 66 are insufficient, however, to overcome the force of a heavy return spring 68 which is connected between the toe 34 of the brake shoe 16 and the heel 40 of the brake shoe 20 to maintain the linings 14 and 18 out of contact with the brake drum 10. It will be observed that in the normal retracted position of the shoes 16 and 20, an extension of the toe 34 abuts the anchor 36 of the brake cylinder 38. The structure by which the heel 40 of the brake shoe 20 is anchored, together with the manner in which the anchoring force of the secondary shoe 20 is utilized, comprises a distinguishing feature of the present invention.

It will be seen that the heel 40 of the brake shoe 20 is provided with a slot 70 disposed above the slot 62 and receiving one end of a rigid link 72. The link 72 is pivoted to a lever 74 intermediate a rounded abutment 76 thereof and a pivot pin 78 by which the lever is pivotally mounted on a mounting lug or bracket 80 integrally formed with the wheel cylinder 38 on the upper right hand side thereof. The lever 74 pivots about a fixed point defined by the pivot pin 78 so that as the shoe 20 moves in a counterclockwise direction during forward motion braking of the vehicle an anchoring force will be transmitted through the link 72 to the lever 74. This force is transmitted from the abutment surface 76 of the lever 74 to a rod 82 formed integrally with a piston 85. The piston 85 is slidably but sealingly mounted within a bore 84 of the wheel cylinder 38 having an axis parallel to the axis of the bores 42 and 44 but spaced above the bores 42 and 44. The piston 85 is normally held against a wall 86 at the right-hand end of the bore 84 by means of a coil spring 88 abutting a washer 90 which is held flatly against the left hand end of the piston 85. It will be seen that the piston 85 is formed with a central recess 92 open to the left hand side thereof and receiving a coil spring 94 which biases a valve member 96 in a left hand direction. Left hand movement of the valve member 96 is normally limited by the abutment of an annular flange 98 of the valve member 96 with the right hand side of the washer 90. The valve member 96 carries a resilient gasket or seal 100 at its left hand end which is engageable with a valve seat surface 102 formed in the wheel cylinder 38 within the bore 84 and facing in a right hand direction. When the seal 100 seats against the surface 102 it serves to cover one end of a passage 104 communicating between the bore 84 and the bore 42. The passage 104 normally admits pressurized hydraulic brake fluid to the bore 42 from the bore 84. The wheel cylinder member 38 is also provided with a passage 106 communicating between the bore 84 and the bore 44 and with an inlet port 108 through which hydraulic brake fluid is delivered to the bore 84 from the master cylinder (not shown) of the brake system.

As is customary in all hydraulic brake systems, the vehicle operator presses the brake pedal to energize a fluid motor in the form of the usual master cylinder and deliver pressurized fluid to the wheel cylinders of each of the brakes. This pressurized fluid is delivered to the wheel cylinder 38 so that it first enters the bore 84 through the passage 108. From the bore 84 pressurized fluid is delivered to the bores 42 and 44 through the passages 104 and 106 respectively. By this means the pistons 48 and 50 are energized to move the brake shoes 16 and 20 radially outwardly into braking engagement with the drum 10. Assuming that the drum 10 is rotating in the direction of the arrow 24, the frictional engagement of the linings 14 and 16 with the drum 10 will carry the shoes 16 and 20 in the same counterclockwise direction. This circumferential movement is resisted by the piston 50 through its link 60 and by the piston 85 and pivot pin 78 through the link 72 and lever 74. If the hydraulic pressure within the bore 84 is sufficient, it will hold the piston 85 against the end wall 86. In this connection it should be pointed out that the piston 50 and its link 60 take an anchoring torque load which is exactly equal to the input force delivered to the primary shoe 16 by the piston 48.

As far as the general arrangement of the shoes 16 and 20 and the service pistons 48 and 50 are concerned, the brake of the present invention is similar to that commonly known as a "duo-servo" brake. In this type of brake it is well known that the frictional drag of the drum acting on the primary brake shoe 16 multiplies the force of the piston 48 in acting on the secondary brake shoe 20. By this means the brake is "self-energized" and the total torque output of the brake as measured by the force at the heel end 40 of the secondary shoe 20 is many times greater than the actuating force applied to the toe 34 of the primary brake shoe 16. The degree of energization or multiplication of the braking force is largely dependent upon the coefficient of friction between the lining 14 of the primary brake shoe 16 and the drum 10. In most duo-servo brakes it is necessary to utilize primary shoe linings having a low coefficient of friction in order to maintain stability. If high coefficient of friction linings are used on the primary shoes of duo-servo brakes, the brakes ordinarily tend to become very erratic in operation and "grab" or "lock up." The present invention contemplates the use of a primary brake shoe 16 having a lining 14 possessing a higher coefficient of friction than may normally be utilized in a duo-servo type brake and incorporates means for controlling or limiting the torque output of the brake to render the brake stable and prevent erratic grabbing of the brakes.

It will be seen that the pistons 48 and 50 actuate the primary and secondary shoes 16 and 20 at similar locations and are biased outwardly with the same force. Accordingly, the input force of the piston 48 which actuates the primary shoe in the forward direction of rotation, will be absorbed by the piston 50 in performing an anchoring function. Therefore, the actuating input force of piston 48 is subtracted from the anchoring load to be borne by the piston 85 by means of the piston 50. Accordingly, the piston 85 will absorb an anchoring load which is proportional to the force resulting from the energization factor. It will be seen that the piston 85 is biased against the anchoring load by means of hydraulic fluid pressure from the master cylinder, and for this reason the piston 85 will resist circumferential movement of the brake shoes with a force linearly proportional to the master cylinder pressure. The amount of fluid pressure necessary to resist the anchoring load will depend upon two factors: the size of the piston 85 and the mechanical advantage offered by the lever 74. In other words, the lever 74 permits a reduction in the size of the piston 85 that would otherwise be necessary. Also, the lever 74 transforms the circumferentially directed force of the secondary shoe 20 so that it is parallel to the axis of the bore 84. If, as a result of excessive energization, the torque overcomes the force of the hydraulic fluid pressure acting against the piston 85, the piston 85 will move to the left until its valve seal 100 closes against the valve seat surface 102 and blocks the delivery of further fluid pressure to the bore 42. However, it will be noted that the anchoring force must also overcome the force of the spring 88 which assists master cylinder fluid pressure in acting against the piston 85. The spring 88 assures the buildup of at least a predetermined minimum amount of anchoring torque before the valve 96 closes. The spring 88 has a strength which is selected to prevent the valve 96 from closing at a torque less than a selected amount.

After closure of the valve 96, the delivery of greater fluid pressure to the bore 84 will move the piston 85 to the right thereby reopening the passage 104 to permit a further pressurization of the bore 42. If, after the valve 96 seats against the valve seat surface 102, the brake anchoring torque is more than sufficient to cause closure of the valve 96, the piston 85 will continue moving to the left. This is permitted by virtue of a lost motion relationship between the valve 96 and the piston 85. Continued movement of the piston 85 to the left permits the shoes 16 and 20 to move in a counterclockwise direction, permitting the piston 48 to follow and relieve the pressure within the bore 42. This, of course, immediately corrects the excessive torque condition and reduces the torque output to the desired level. In normal operation, the valve 96 remains substantially in "lap" position, opening and closing as necessary. That is to say, the valve 96 remains closely adjacent the seat 102 and either admits a small amount of fluid into the passage 104 or permits the escape of a small amount of fluid out of the passage 104 according to the relative forces acting on the piston 85.

It is to be noted that the valve 96 also functions as a check valve. Should the pressure within the bore 84 ever fall below the pressure in the bore 42, fluid pressure in the passage 104, acting against the seal 100, would force the seal 100 off of the seat 102 thereby permitting fluid to escape from the passage 104.

As indicated above, the present invention may utilize a primary lining 14 having a greater coefficient of friction than is normally permissible with a duo-servo type brake. This is because the device of the present invention imposes a control on the torque output which is not present in ordinary duo-servo brakes. Accordingly, excessively high torque outputs are prevented and the torque output will vary in a linear relationship to the master cylinder pressure delivered to the bore 84.

In the reverse direction of drum rotation, the piston 50 will serve to move the heel 40 of the secondary shoe 20 radially outwardly. Initially, the piston 48 also produces a radially outward movement of the shoe 16, but as soon as contact of the linings is made with the drum 10, the drum 10 carries the shoes in a clockwise direction causing the piston 48 to move back within its bore 42 until the extension of the toe 34 of the primary shoe 16 seats against the anchor 36. It will be seen that in the reverse direction of rotation, no control is imposed on the brake torque output. However, the speed at which the vehicle is ordinarily moving during reverse braking is not great, and the likelihood of the brakes grabbing and becoming uncontrollable is therefore very slight.

The brake of the present invention may be utilized on each of the four wheels of a passenger car or truck in such a manner as to achieve compensation for the phenomenon of weight transfer from the rear wheels to the front wheels during a high energy stop. Ordinarily, the center of mass of a car is above the axles and during braking, a couple is developed about this center of mass which transfers a portion of the vehicle weight borne by the rear wheels to the front wheels. For this reason, the front wheels are capable of delivering a higher braking effort without skidding than the rear wheels during high rates of deceleration. It is, therefore, desirable that the front wheels deliver a greater percentage of the braking effort than the rear wheels during rapid deceleration. For this purpose the brakes that are mounted on the rear wheels are provided with springs 88 which are substantially stiffer than the springs 88 incorporated on the brakes of the front wheels. By this means, the valve 96 of the rear wheel brakes will be rendered ineffective to limit the torque output of the rear brakes until a substantial master cylinder pressure has been built up. For example, the spring 88 of the rear brakes may be designed to withhold operation of valve 96 until a master cylinder pressure of approximately 350 p.s.i. is reached, while the spring 88 of the front brakes may be designed to permit operation of the valve 96 at a master cylinder brake pressure of about 150 p.s.i. The torque output of the rear brakes will, therefore, be substantially greater than the front brakes during conditions of light braking when the master cylinder is producing between 150 and 350 p.s.i. During high energy stops in which a pressure greater than the preselected amount is realized, the torque output of the rear brakes will be limited to bear a predetermined relationship to master cylinder pressure. Furthermore, the piston 85 of the rear brakes may be so proportioned that the torque output of the rear brakes is held to a desired lower level than the torque output of the front brakes. On the other hand, the bores 42 and 44 of the front wheel brakes may be proportioned substantially larger than the wheel cylinder bores 42 and 44 of the rear brakes.

FIG. 3 illustrates a modified form of the present invention which utilizes a wheel cylinder 110 mounted on a backing plate 112 secured to a nonrating part of the vehicle adjacent a brake drum 114. The wheel cylinder 110 is located between the adjacent ends of a primary brake shoe 116 and a secondary brake shoe 118. The primary brake shoe 116 is provided with an extension 120 engageable with an anchor 122, formed as an integral lug or boss on the wheel cylinder 110. The adjacent ends of the shoes 116 and 118 are urged toward one another by a heavy return spring 124. The primary brake shoe 116 is designed to be moved radially outwardly into engagement with the drum 114 by means of a piston 126 slidable in a bore 128 of the wheel cylinder 110 and is fitted with a link 130 engageable in a slot 132 of a brake shoe 118. Assuming that the drum 114 rotates in the direction of the arrow 134 (counterclockwise) during forward movement of the vehicle, the anchoring torque of the brake shoes will be taken in part by a piston 136 slidable in a bore 138 of the wheel cylinder 110. This is accomplished by the abutment of a heel end 140 of the brake shoe 118 with a curved abutment surface 142 of a bellcrank lever 144 having a terminus 146 engageable with a rod 148 formed integrally with the piston 136. It will be seen that the abutment surface 142 is located intermediate the terminus 146 and a pivot pin 150, by which the lever 144 is mounted on the backing plate 112.

The bores 128 and 138 face in opposite directions and are separated by a wall 152 having a passage 154 therethrough. The passage 154 is adapted to be closed by means of a valve member 156 held against the left hand side of the piston 136 by means of a coil spring 158. The spring 158 also serves to bias piston 136 in an outward direction, functioning in a manner similar to the spring 88 of the prior embodiment of the invention. When the anchoring force imposed upon the piston 136 is sufficient to overcome the combined force of the spring 158 and the force produced by hydraulic pressure in the bore 138 acting against the piston 136, the piston 136 will move to the left causing the valve member 156 to close the passage 154. Fluid is admitted into the bore 138 from the master cylinder through a passage 160. Fluid pressure is transmitted to the bore 128 for the purpose of actuating piston 126 from the bore 138 through the passage 154 in the wall 152.

The brake of FIG. 3 operates in a somewhat similar manner to the prior embodiment of the invention during forward motion braking. Fluid pressure from the master cylinder is transmitted through the passage 160 to the bore 138 and thence through the passage 154 to the bore 128. This causes the piston 126 to move outwardly and bring the friction lining of the brake shoe 116 into frictional engagement with the drum 114. The rotation of the drum will carry the brake shoes 116 and 118 in a counterclockwise direction with the anchoring load or torque output of the shoes being taken by the pivot pin 150 and the piston 136 through the lever 144 and piston rod 148. The torque output is substantially greater than the force acting against the piston 126 as a result of the energization of the brakes and its magnitude is controlled by the piston 136. During a low torque output condition, the spring 158 will prevent the piston 136 from moving away from a retaining washer 162 and dust boot 164 against which it is normally held by said spring. The amount of torque or anchoring force required to move the piston 136 against the combined forces of the spring 158 and hydraulic pressure within the bore 138 is determined by the strength of the spring 158, the diameter of the piston 136, and the design of the lever 144. The lever 144 not only reduces the size to which the piston 136 must be proportioned in order to balance a given braking load, but also changes the circumferentially directed force of the shoe 118 to act in a direction parallel to the bore 138.

It will be seen that the embodiment of the invention illustrated in FIG. 3 is substantially simpler than the form of the invention illustrated in FIG. 2. However, the form of the invention illustrated in FIG. 3 does have certain limitations. In the first place, the structure illustrated in FIG. 3 does not subtract the applied force of the piston serving the primary brake shoe from the anchoring load received by the piston 136. Accordingly, the relationship of the degree of energization to master cylinder pressure is not entirely linear, although in view of the amount of energization normally experienced, the variance is not great. Furthermore, it will be seen that on reverse braking, the brake is, in fact, deenergized as a result of the fact that the anchoring load is taken directly on the service piston 126. The anchoring lug 122 only serves to position the primary shoe 16 when the brakes are not applied. However, in vehicles where no substantial degree of braking force is required for reverse operation of the vehicle, the embodiment of FIG. 3 may find particular utility.

While it will be apparent that the preferred embodiments of the invention illustrated herein are well calculated to fulfill the objects above stated, it will be apparent that the invention is susceptible of variation, modification and change without departing from the fair scope or the meaning of the subjoined claims.

What is claimed is:

1. A drum brake having a pair of arcuate brake shoes, means connecting said brake shoes at adjacent ends thereof, a wheel cylinder adjacent the other ends of said brake shoes, said wheel cylinder being connected to a source of fluid pressure, first and second opposed service pistons of equal size operable to move said brake shoes in a radially outward direction in response to pressure from a fluid motor, a valve operable to interrupt the delivery of fluid pressure to one of said service pistons from said fluid motor and prevent the further pressurization of said one service piston while keeping the other of said service pistons open to said source of fluid pressure, and a third valve controlling piston biased by fluid from said fluid motor in a direction tending to maintain said valve open and operable to receive at least a portion of the anchoring torque from said shoes in a direction tending to close said valve.

2. The structure set forth in claim 1 including a spring biasing said valve controlling piston in a direction opposing the anchoring torque applied to said valve controlling piston and maintaining said valve in an open condition during a predetermined initial braking effort.

3. The structure set forth in claim 1 including a fixed support, a lever pivotally mounted on said fixed support and operable to apply a force to said valve controlling piston at one end thereof, the other of said brake shoes being operable to apply an anchoring force to said lever at a location intermediate its point of pivotal support and its point of delivery of force to said valve controlling piston whereby a portion of the anchoring force of said brake shoes will be taken by said fixed support and a portion of said anchoring force will be taken by said valve controlling piston.

4. The structure set forth in claim 3 in which said fixed support comprises a lug formed on said wheel cylinder.

5. The structure set forth in claim 3 in which said fixed support comprises a backing plate on which said wheel cylinder and said brake shoes are mounted.

References Cited
UNITED STATES PATENTS

| | | | |
|---|---|---|---|
| 1,648,821 | 11/1927 | Pugh | 188—152 |
| 2,214,679 | 9/1940 | Scott | 188—152 |
| 3,182,760 | 5/1965 | Stelzer | 188—152 |

FOREIGN PATENTS

| | | |
|---|---|---|
| 1,146,888 | 5/1957 | France. |

MILTON BUCHLER, *Primary Examiner.*

G. E. HALVOSA, *Assistant Examiner.*